Feb. 12, 1957 L. W. RUSSELL 2,781,075
CONVOLUTION FORMING METHODS AND APPARATUS
Filed Sept. 17, 1952 4 Sheets-Sheet 1
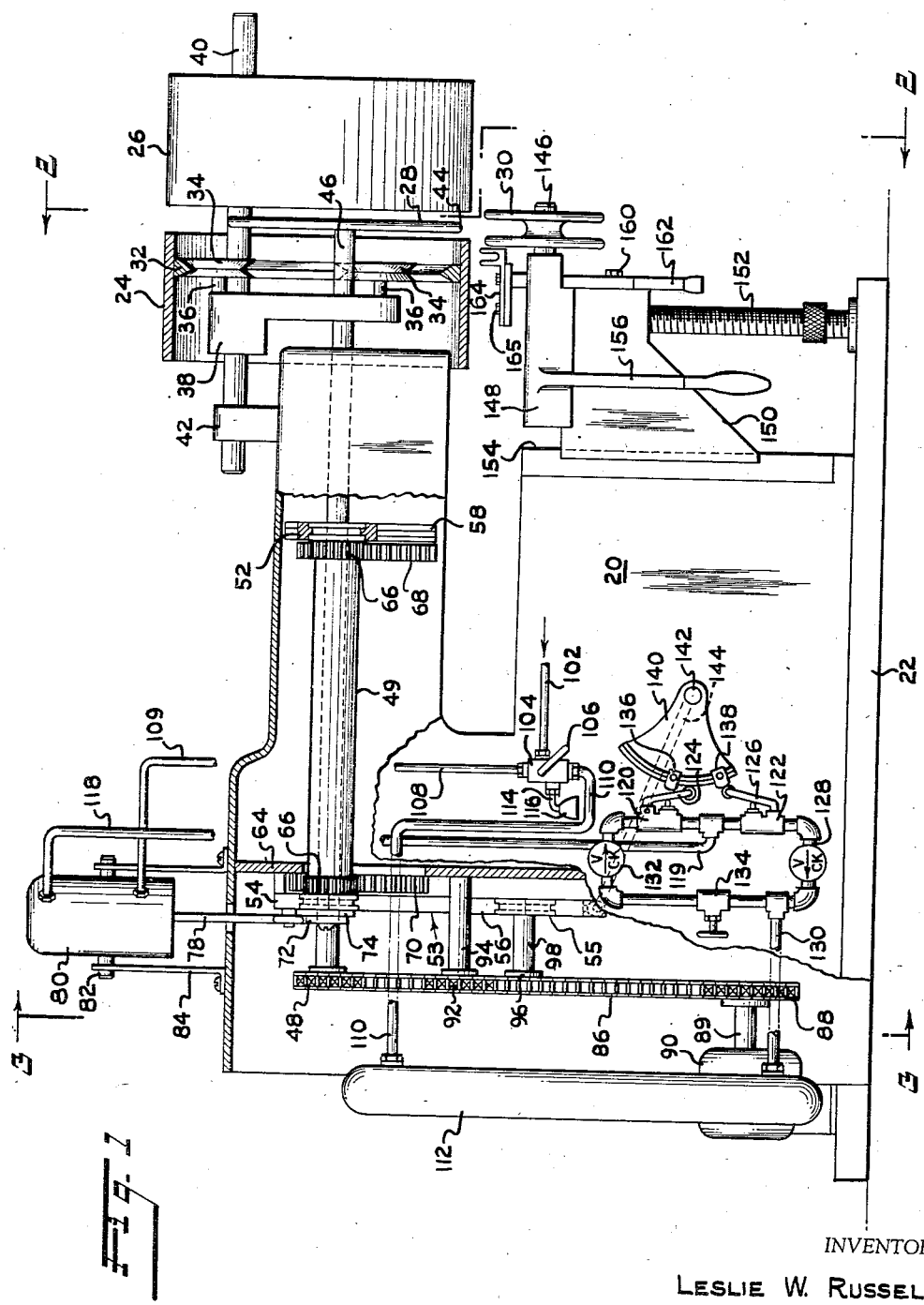
INVENTOR
LESLIE W. RUSSELL
BY Strauch, Nolan + Diggins
ATTORNEYS

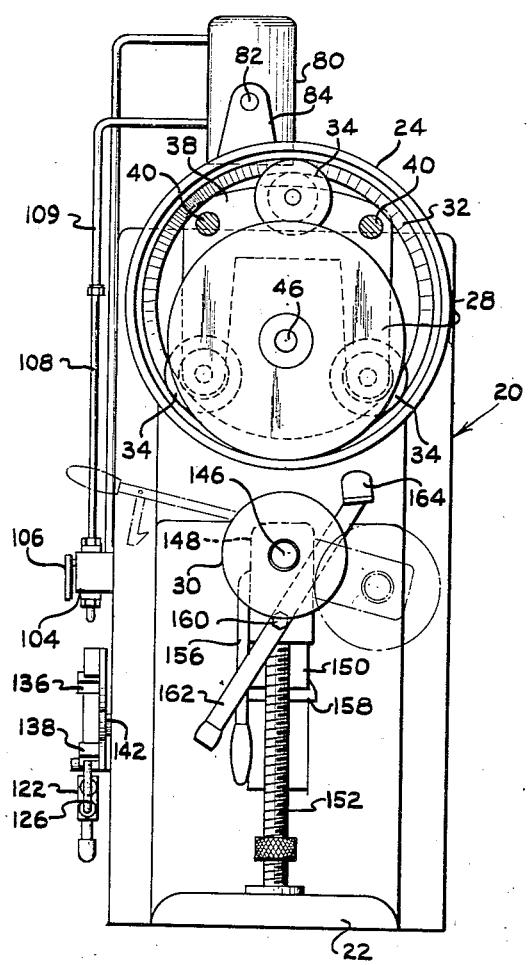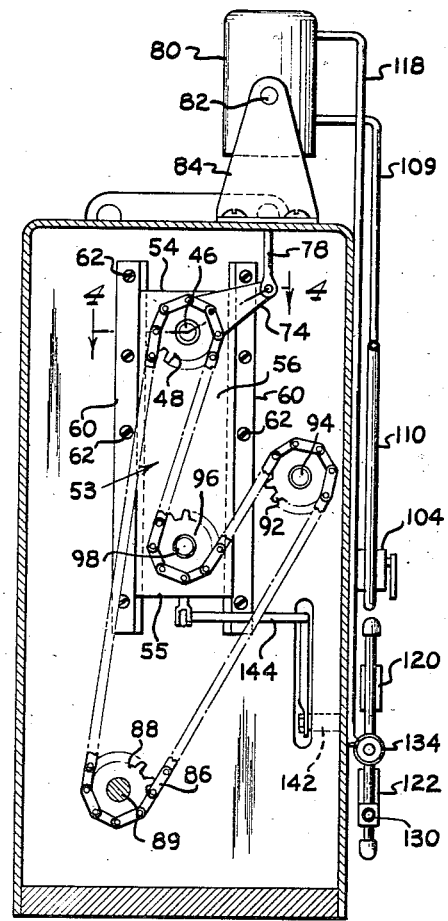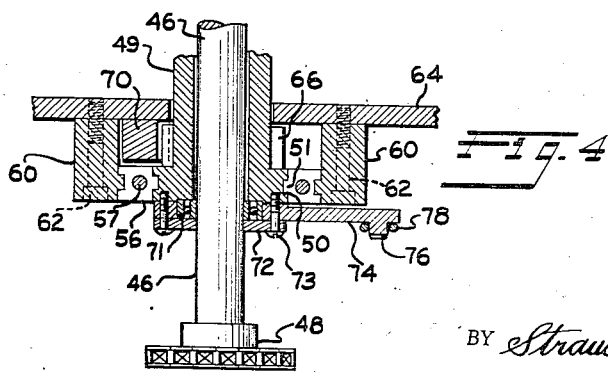

Feb. 12, 1957 L. W. RUSSELL 2,781,075
CONVOLUTION FORMING METHODS AND APPARATUS
Filed Sept. 17, 1952 4 Sheets-Sheet 3
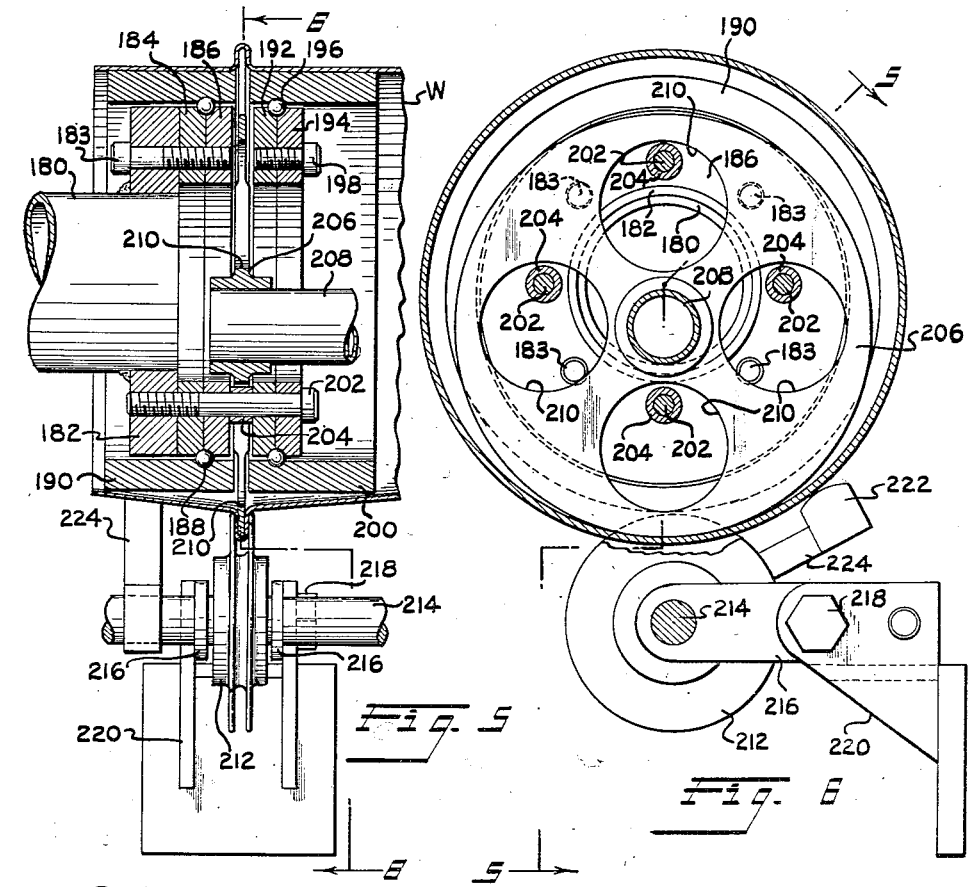
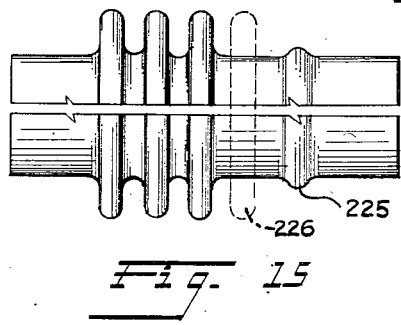
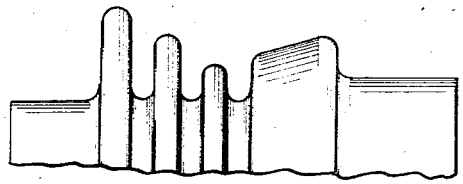
INVENTOR
LESLIE W. RUSSELL
BY Strauch, Nolan & Diggins
ATTORNEYS

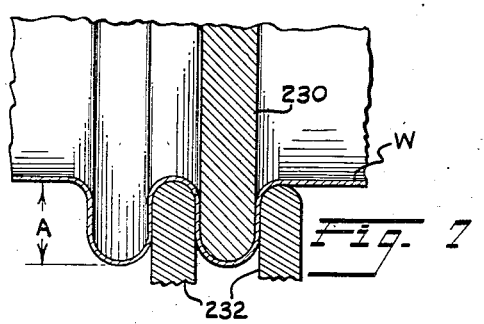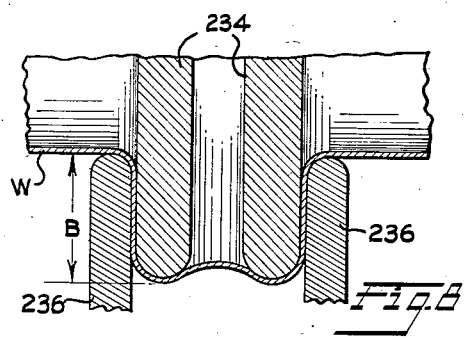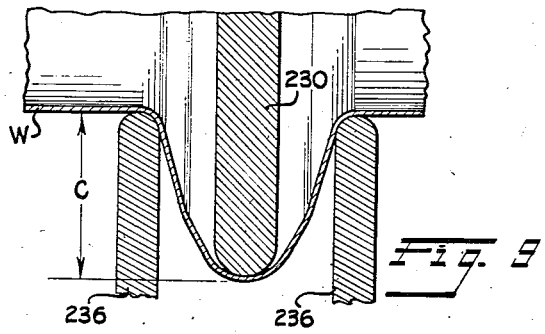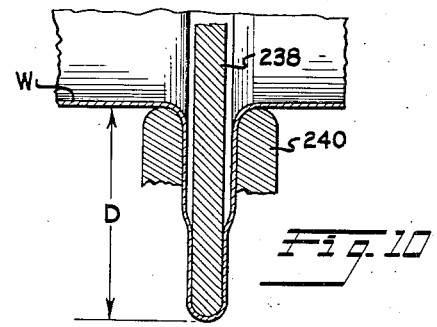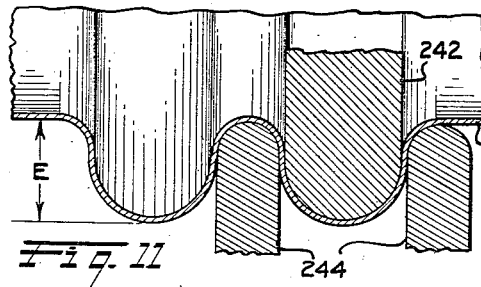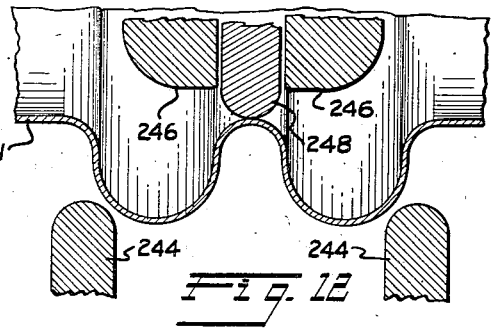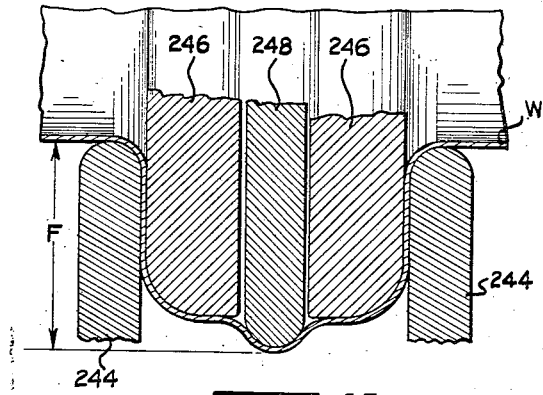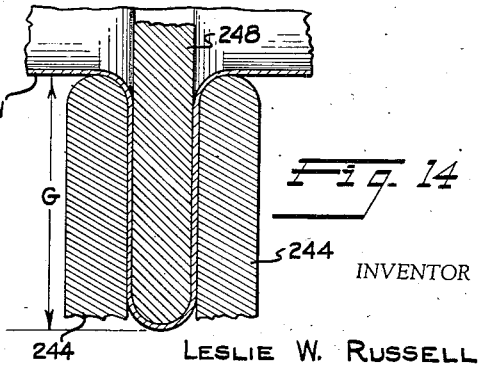
INVENTOR
LESLIE W. RUSSELL
BY Strauch, Nolan & Diggins
ATTORNEYS United States Patent Office 2,781,075
Patented Feb. 12, 1957

2,781,075
CONVOLUTION FORMING METHODS AND APPARATUS

Leslie W. Russell, San Diego, Calif., assignor to Solar Aircraft Company, San Diego, Calif., a corporation of California Application September 17, 1952, Serial No. 309,985

11 Claims. (Cl. 153—77)

This invention relates to methods and apparatus for forming sheet metal and more particularly to methods and apparatus for forming a series of single convolutions in a tubular workpiece.

Despite the development of methods and apparatus for producing corrugated work pieces on a mass production basis with acceptable accuracy, the need for inexpensive methods and machines for accurately fabricating such units in limited quantities, for example, in test runs which do not justify the expense of currently available machines has long been recognized in the art. This need is especially acute in connection with the formation of corrugated pieces where accuracy is of paramount importance and close tolerances must be maintained with apparatus of minimum expense capable of producing a wide variety of corrugated shapes. Because of the lack of adequate machinery for the formation of the corrugated work pieces on an individual basis it has been common to make such parts by hand at considerable expense in labor and time or to modify by hand the product of an expensive mass production apparatus.

The two principal prior methods for forming convolutions are typified by the patent to Zimmerman No. 1,711,075 and the patent to Dreyer No. 1,882,182. The former involves the application of pressure to opposite sides of the tubular workpiece and a final axial collapse of the workpiece to complete the formation of the convolution. This method, while relatively satisfactory for mass production, does not lend itself to the production of individual convolutions to the close tolerances required in test purposes. Further the corrugations produced by this method inevitably have regions of different thickness because of the stretching of the metal in the formation of the convolutions. Such differential thicknesses produce unpredictable differentials in the contraction and expansion characteristics of the completed unit and often lead to localized overstressing which produces fractures when the cylinder is subjected to vibration or tension under varying temperatures and pressures.

The Dreyer method, utilizing the principles of compression forming, produces a convolution which is even less accurate than that produced by tension forming and cannot be utilized to form a plurality of different configurations on a single workpiece. Further, this apparatus is prohibitively expensive for the formation of limited quantities of corrugated units.

It is, accordingly, the primary purpose and object of the present invention to provide methods and apparatus for the production of corrugated metal cylinders with greater accuracy than heretofore possible at reduced cost.

It is also an object of the invention to provide methods and apparatus for forming convolutions in a tubular workpiece with no appreciable variation in the thickness of the metal at the radii of the corrugations and other critical points.

It is an additional object of the invention to provide novel apparatus for forming corrugated metal cylinders comprising a simple, inexpensive attachment for a standard metal lathe.

It is a further object of the invention to provide novel methods and apparatus for forming a plurality of corrugations of different configuration in a single tubular workpiece.

It is also an object of the invention to provide novel methods and apparatus for forming smooth walled wrinkle-free corrugations in a tubular workpiece.

It is another object to provide novel methods and apparatus for the tension forming of deep convolutions in a plurality of stages.

Other objects and advantages will become apparent as the description proceeds in connection with the accompanying drawings in which:

Figure 1 is a side elevation of one form of apparatus constructed in accordance with the present invention with parts broken away to show interior details;

Figure 2 is an end view of the apparatus of Figure 1 partially in section along line 2—2 of Figure 1;

Figure 3 is a vertical section taken along line 3—3 of Figure 1;

Figure 4 is a transverse fragmentary section taken along line 4—4 of Figure 3;

Figure 5 is a view partly in section of a further embodiment of the invention which may be used on a standard metal working lathe;

Figure 6 is sectional view taken along line 6—6 of Figure 5;

Figures 7, 8, 9 and 10 illustrate diagrammatically the successive stages in a method according to the present invention having particular utility in forming deep convolutions in a tubular workpiece.

Figures 11, 12, 13 and 14 illustrate the successive stages in an alternate method of forming a deep convolution; and Figures 15, 16 and 17 illustrate typical corrugated cylinders produced by the methods and apparatus of the present invention.

Referring now more particularly to the apparatus of Figures 1 through 4, the drive mechanism and a portion of the control mechanism of the convolution forming machine there shown enclosed in a shell-like housing 20, indicated diagrammatically, mounted on a stand 22. The principal components of the work forming apparatus comprise a pair of rotatable guide rolls 24 and 26, an inner forming roll 28 and an outer forming roll 30. The inner guide rolls 24 and 26 are of hollow cylindrical construction and have an outer diameter preferably slightly less than the inner diameter of the workpiece. The roll 24 is supported for free rotational movement on a trackway 32 attached to the inner surface of the roll, the trackway riding on three grooved rolls 34. The rolls 34 are rotatably mounted on shafts 36 which project outwardly from a support member 38. The support member 38 is rigidly supported on two bars 40 which extend through standard 42 rigidly secured to the upper surface of the housing 20. A similar construction is provided to rotatably mount the support roll 26 for free rotation co-axially with roll 24.

The inner forming roll 28, the outer forming edge 44 of which may have any suitable configuration, is mounted for rotation with a driven shaft 46. At its opposite end the shaft 46 carries a sprocket 48. Intermediate its ends the shaft 46 is rotatably supported in an elongated housing 49 by means to be described. The opposite ends of the housing are enlarged and are provided with machined annular grooves 50 which receive mating ridges 51 of bearing blocks 52 and 53 respectively. The bearing block 52 comprises two mating half sections suitably clamped around the shaft housing. The block 53 includes identical top and bottom sections 54 and 55 secured to an elongated intermediate section 56 as by bolts 57.

The bearing block 52 is mounted for vertical reciprocation in guideways 58 attached to or formed in the vertical walls of the housing 20. The elongated bearing block 53 is similarly mounted in vertical guideways 60 secured as by screws 62 to a vertical interior partition 64 within the housing 20.

The shaft housing 49 is provided at its opposite ends with gear teeth, as at 66, which mesh with racks 68 and 70, the rack 68 being secured to the inner vertical wall of housing 20 and the rack 70 being suitably secured to an inner edge of one of the guide rails 60.

With particular reference to Figure 4 it will be seen that the outer end of the shaft housing 49 is recessed to receive a bearing assembly 71 on which the shaft 46 is rotatably supported. A similar assembly is provided at the opposite end of housing 49. The bearing assembly 71 is held in place by a cover plate 72 secured to the outer end of the shaft housing by screws 73. The screws 73 also serve to secure an arm 74 to the outer end of the shaft housing 49 for movement therewith. The outer end of the arm 74 is provided with a boss or pin 76 to which the lower end of a piston rod 78 is pivotally secured.

The upper end of the piston rod 78 is connected to an operating piston, not shown, received within an operating cylinder 80 pivotally mounted as at 82 on a stand 84 secured to the top of housing 20.

As the rod 78 is caused to reciprocate by the action of the cylinder 80, the shaft housing 49 is rotated about its own axis and through the action of the gears 66 and the racks 68 and 70, the shaft housing is displaced vertically carrying the roll shaft 46, for a purpose to appear.

Rotary drive is transmitted to the shaft 46 through the sprocket 48 by a chain drive 86 which passes over a drive sprocket 88 mounted on the shaft 89 of any suitable power source, such as a motor 90. The chain 86 also passes over an idler sprocket 92 rotatably mounted on a shaft 94 rigidly secured to the vertical wall 64. A second idler sprocket 96 is mounted on a shaft 98 the inner end of which is rotatably mounted in bearing blocks 55 and 56 so that the shafts 46 and 98 and their associated sprockets 48 and 96, respectively reciprocate together during the vertical movement of the piston rod 78. Thus the length of the drive chain 86 and its tension is kept constant throughout the range of vertical movement of the roll shaft 46.

The semi-automatic apparatus for energizing the cylinder 80 will now be described with particular reference to Figure 1. Essentially the actuating mechanism consists of an air circuit and a hydraulic circuit, the former being employed for actuation, and the latter being employed for control.

Air is supplied at any suitable operating pressure from a source, not shown, through a supply conduit 102 connected to a four-way valve 104 which may be manually controlled by handle 106. One port of the valve 104 communicates with a conduit 108 connected through a flexible section 109 to the lower end of cylinder 80. Another port of valve 104 is connected to a conduit 110 which leads to the upper end of an air hydraulic reservoir 112. The valve 104 is also provided with an exhaust conduit 114 equipped with a felt packed muffler 116. The valve 104 is arranged to connect either conduits 102 and 108 while connecting exhaust conduit 114 and conduit 110 or to connect conduits 102 and 110 while connecting conduit 108 to exhaust conduit 114.

The upper end of cylinder 80 is connected to a flexible conduit 118 which forms a part of the hydraulic circuit. The conduit 118 is connected at its lower end to a rigid conduit 119 which leads through a T-fitting to normally open control valves 120 and 122 adapted to be actuated, respectively, by arms 124 and 126. The lower side of the valve 122 is connected through a one-way check valve 128 to a conduit 130 leading to the lower end of the reservoir 112 which contains hydraulic fluid. The upper end of the valve 120 is connected to an oppositely directed check valve 132 and through a controllable bleed 134 to the common conduit 130. The normally open valves 120 and 122 are adapted to close when the outer ends of the arms 124 and 126 contact the dogs 136 and 138 which are adjustably mounted on a control plate 140. The control plate 140 is mounted on shaft 142 rotatably supported on the side of the housing 20 and is rotated about the axis of shaft 142 by means of an arm 144 rigidly secured to the inner end of shaft 142. The arm 144 is pivotally secured at its opposite end to the bottom of the bearing block 53.

Assuming the parts to be in the position shown, with the roll shaft 46 and roll shaft housing 49 in the fully raised position, the operating handle 106 of the valve 104 occupies the position shown, at which time pressure is supplied to the lower end of cylinder 80 through conduits 102 and 108 so that the entire mechanism is yieldingly biased under air pressure to its upper position. At this time the upper end of the reservoir 112 is connected through conduit 110 to exhaust and the arm 126 contacts the dog 138 to close valve 122. The roll shaft housing 49 and the shaft 46 carrying forming roll 28 may be lowered by moving valve handle 106 to connect conduits 102 and 110 applying air to the upper end of reservoir 112 and at the same time to connect conduit 108 to exhaust. Fluid will then be exhausted from reservoir 112 through conduit 130 and will pass through the bleed 134, check valve 132 and open valve 120 to conduit 119 and 118 thence to the upper end of cylinder 80 to urge the operating piston down. The downward movement of the apparatus will continue until dog 136 contacts the control arm 124 and closes valve 120 at which time no further fluid is supplied through conduit 118 since check valve 128 is closed and valve 120 is closed. The downward movement of the apparatus is thus arrested at a predetermined point depending upon the setting of the dog 136, which can be regulated as required. The apparatus may be returned to its original position by connecting conduits 102 and 108 simultaneously connecting conduit 110 to exhaust.

With particular reference to Figures 1 and 2, the grooved outer forming roll 30 is rotatably mounted in register with the inner forming roll 28 on a shaft 146. The shaft 146 is supported at its inner end in a block 148 which is hingedly secured to a stand 150 supported on a jack 152 for vertical sliding adjustment along guideways 154 formed in the forward edge of housing 20. The block 148 may be moved about its hinge by a handle 156 which is provided with a locking arm 158 to hold the block 148 and the roll in the position as shown in Figures 1 and 2 in full lines.

Pivotally mounted as at 160 on the forward edge of the stand 150 is a lever 162 on which a grooved guide block 164 is supported for adjustment in a direction parallel to the axis of shaft 46 by screws 165.

In operation, the tubular workpiece is slipped over the forming rolls 24 and 26 until the portion of the workpiece to be formed is in register with the gap between the two rolls. With the outer forming roll in position shown in Figures 1 and 2 the operating lever 106 is moved to lower the roll shaft 46 and the inner forming roll 28 as previously described. The roll 28 is thus moved into contact with the inner surface of the workpiece and the latter is forced outwardly between the opposite ridges of the outer forming roll 30 to form a convolution. The entire forming operation is ordinarily completed in one or two revolutions of the forming roll 28, and because the tubular workpiece is freely slidable on the rolls 24 and 26 is accomplished with negligible stretching of the formed metal. When the convolution is completely formed the forming roll 28 is withdrawn by operation of the cylinder 80 in the manner previously described. The handle 156 is then unlocked and the support 148 is tilted on its hinge connection moving roll 130 to the dotted line position of Figure 2, disengaging the roll from the formed convolution. The handle 162 is similarly moved to position the guide plate 164 out of register with the formed convolution. The workpiece is then axially moved manually along the support rolls 24 and 26 until the formed convolution is in register with the grooved portion of the guide plate 164. The handle 162 is then rotated in a clockwise direction to move the grooves of plate 164 onto the formed convolution, thus determining the axial position of the formed convolution with respect to the rolls 24 and 26 and positioning an unformed portion of the workpiece in register with the opposite rolls 28 and 30.

The second convolution is then formed by the same process as the first after the roll 30 is restored to its original position. By suitable adjustment of the guide plate 164 the distance between convolutions can be easily regulated.

In installations where the production rate does not justify the expense of the complete apparatus above described it is advisable to modify existing equipment to form the desired corrugated units. To this end the invention also provides a simple apparatus which permits utilization of a standard lathe to produce corrugated units to close tolerances at minimum expense. Such a mechanism is shown in Figures 5 and 6. With continuing reference to Figures 5 and 6, a shaft 180 to which a flange 182 is welded is adapted to be received within the chuck of a standard lathe for rotation therewith. Secured to the outer surface of flange 182 as by a plurality of circumferentially spaced bolts 183 is an inner bearing assembly comprising a pair of flat rings 184 and 186. At their adjoining peripheral edges the rings 184 and 186 are grooved to receive bearings 188 on which an inner work guide roll 190 is rotatably supported. An outer bearing assembly comprising a pair of similar rings 192 and 194 carrying bearings 196 are secured together by a plurality of bolts 198 and rotatably support a second guide roll 200. The rings 192 and 194 are secured to each other and to the flange 182 by a plurality of bolts 202 circumferentially spaced from bolts 183 and 198. The two bearing assemblies are held in predetermined spaced relation by spacers 204 which are telescoped over the bolts 202.

An inner forming roll 206 is supported on a shaft 208 adapted to be rotatably mounted in the cross head of a standard lathe which ordinarily is movable either automatically or manually either vertically or horizontally. As best seen in Figure 5, the inner forming roll 206 is positioned between the two bearing assemblies and is provided with a plurality of circular apertures 210 through which the bolts 202 and spacers 204 extend.

The outer forming grooved roll 212 is rotatably mounted on a shaft 214 which is supported on opposite sides of the roll 212 in arms 216 pivotally secured by a bolt 218 to a bracket assembly 220 adapted to be mounted on a convenient part of the lathe assembly. Thus the distance between the centers of shafts 180 and 214 may be regulated as required by the particular forming operation to be performed. An adjustable guide block 222, similar to block 164, is mounted on an arm 224 pivotally secured to shaft 214.

The operation of the apparatus of Figures 5 and 6 is similar to that of the apparatus of Figures 1 through 4 except that the movement of the forming roll is ordinarily performed manually in the former. The apparatus is shown in Figure 5 at the completion of a forming operation. It will be understood that the workpiece W is initially loosely telescoped over the guide rolls 190 and 200 with the shaft 208 arranged to dispose all portions of the forming roll 206 within the diameter of the rolls 190 and 200. With the apparatus in this position the head stock is rotated by its normal driving apparatus causing rotation of the shaft 180 together with flange 182 and the bearing assemblies 184—186 and 192—194. The inner forming roll 206 is thus rotated by the contact of spacers 204 with the edges of the apertures 210 in the forming roll. The guide rolls 190 and 200 ride freely with the workpiece because they are mounted on anti-friction bearings 188 and 196, and their rotational motion comes only from contact with the workpiece.

To form the convolution in the workpiece the shaft 208 of the forming roll 206 is gradually displaced from its initial central position to the position shown, forcing the portion of the workpiece outwardly into the groove of the outer forming roll 212 as shown in Figure 5. Because of the looseness of the workpiece on the guide rolls 190 and 200, the unformed portions of the workpiece are drawn axially inwardly on the guide rolls so that the stretching of the metal during the formation of the convolution is held to a negligible minimum. At the completion of the forming operation the roll 208 is restored to its central position at which time the workpiece will spring back into a generally cylindrical shape with the exception of the formed convolution. The outer forming roll 212 is then lowered to clear the formed convolution and the workpiece is shifted axially on the rolls 190 and 200 to dispose the formed convolution in the grooves of the guide block 222. The succeeding convolution is formed by the process above described after the roll 212 has been restored to the position shown in Figures 5 and 6.

It is to be noted that the size of the internal forming roll in both forms of the invention is the maximum allowable within the limits dictated by the size of the adjacent components of the apparatus. Thus, the greatest possible peripheral area of the roll contacts the workpiece, it having been found that this condition substantially improves the quality of the finished workpiece.

One of the major problems encountered with previous convolution forming machines was the difficulty in maintaining the inside diameter of the workpiece at its initial value. It has been found by actual test that the provision of the internal freely rotatable guide rolls of both forms of the invention and their utilization in predetermined relation to the external forming rolls has solved this problem in a highly satisfactory manner.

Another important advantage of the present invention resides in the fact that the deformed metal is allowed to "flow" thus substantially completely eliminating the variations in thickness in the formed metal invariably produced by the methods of the prior art. The flow of the metal is indicated in Figure 15. The initial bulge produced at the beginning of the forming operation is indicated at 225. As the forming operation continues, the bulge 225 develops into crest 226, as shown in dotted lines, drawing metal in a smooth flow from each side since the workpiece is loosely supported on the inner support rings or guide rolls.

It will be understood that by the substitution of inner and outer forming rolls of different size, configuration, width and depth for each forming operation, a convoluted workpiece can be formed having a series of convolutions of widely differing configuration. A typical example of a finished workpiece having convolutions of different form is illustrated in Figure 16.

Because of the fact that, in accordance with the present invention, the convolutions are formed with a minimum of stretching the above described methods and apparatus are ideally suited to the formation of extremely deep convolutions. While the above described method can be utilized to form convolutions of depth considerably beyond that obtainable in prior machines, it is preferable to form extremely deep convolutions, particularly those of relatively narrow width, in a series of stages. Two methods for forming such extremely deep convolutions are illustrated respectively in Figures 7 through 10 and Figures 11 through 14.

With particular reference to Figures 7 through 10, Figure 7 illustrates the configuration of the workpiece after the formation of a pair of identical convolutions in accordance with the above described method with inner and outer forming rolls 230 and 232, respectively, of the type shown in Figure 1. After the formation of the two identical convolutions shown in Figure 7, an inner roll 234 having spaced forming portions is substituted for the roll 230 and an outer roll 236 having a central groove corresponding to the combined width of the two adjacent convolutions as substituted for the outer forming roll 232 as shown in Figure 8. The two adjacent convolutions are thus deepened until the surface between them is substantially flat. It is to be noted that during this operation the central portion of the final convolution is not touched by either of the dies and for this reason it is not stretched or work hardened to any appreciable extent.

After the completion of the forming operation illustrated in Figure 8, the inner roll 230 is again substituted for the inner roll 234 and the central portion of the convolution is forced outwardly to further deepen the convolution as shown in Figure 9. For the final operation, as shown in Figure 10, a narrow inner roll 238 is substituted for the inner roll 230 and a deeply grooved relatively narrow outer roll 240 is substituted for the outer roll 236 and the convolution is rolled to its full depth, the outer roll forming the sides of the convolution inwardly during this operation.

Figures 11 through 14 and 17 illustrate a method and apparatus particularly adapted for the production of extremely deep convolutions in workpieces of a wide variety of gauges. In this process, pairs of adjacent convolutions are rolled with an inner forming roll 242 and a pair of outer rolls 244 as previously described. In the second stage, as shown in Figure 12, the rolls 244 are spaced apart a distance somewhat less than the distance between the outer walls of the adjacent convolutions. The inner roll 242 in this stage is replaced by an inner roll group having a pair of identical end rolls 246 between which a narrow roll 248 of greater diameter than the rolls 246 is received. The convolution, after the completion of the operation by the rolls 246 and 248 is illustrated in Figure 13. In the final stage the inner rolls 246 are removed and the outer rolls 244 are repositioned to space them a distance slightly greater than the width of the inner roll 248 and the convolution is formed to its full depth as shown in Figure 14.

The displacement of the metal in the final operation of the method of Figures 11-14 is shown in Figure 17. The contour of the convolution at the completion of the forming stage shown in Figure 13 is indicated in dotted lines in Figure 17 as at 260. The final convolution formed at the completion of the operation shown in Figure 14 is indicated at 262 in full lines in Figure 17. As in the case of the formation of the simple convolution of Figure 15, the metal is caused to flow freely from both sides to form the final deep convolution thus minimizing stretching with the resultant thickness and hardness variation invariably associated with the methods of the prior art.

It is believed that the range and efficacy of the present apparatus and methods can be best illustrated by reference to the dimensions of workpieces actually formed in accordance therewith. For example the method of Figures 7 through 10 has been successfully performed with a tubular workpiece having an initial inside diameter of 18" and a gauge of .025". Assuming these dimensions, the convolutions formed in the first stage illustrated in Figure 7 will be approximately 1" in depth as indicated by the dimension A on Figure 7. In the stage illustrated in Figure 8 the depth of the convolutions as indicated by the dimension B will be 1½". The depth of the convolutions in Figure 8, illustrated by the dimension C, is increased to 2" and the final depth of the convolutions, indicated by the dimension D in Figure 10, may be 2½". With the convolutions so formed to its final depth the gauge of the metal at the peak of the convolution will be approximately .021 while the gauge of the metal along the wall of the convolution will be approximately .022. Thus while the inside diameter of the workpiece has been increased 27% the gauge of the metal has been decreased only 16% which represents a significant advance over the practice according to all known prior methods.

In connection with the method illustrated in Figures 11 to 14, assuming an initial inside diameter of 18" and a gauge of .043 in a tubular workpiece formed, for example, of type 321 stainless steel, the convolutions are formed to an initial depth of .8" as indicated by the dimension E in Figure 11. The convolutions are substantially deepened as indicated by the dimension F in Figure 13 to 1⅝", and the convolutions are formed to a final depth of 2" as indicated by the dimension G in Figure 14. In working with stainless steel of this gauge it has been found desirable to anneal the workpiece between the stages shown in Figures 13 and 14. If this is done the lowest thickness of the workpiece at the peak of the convolution will be in the neighborhood of .029" representing a 32½% decrease in the metal thickness.

Thus it will be seen that the above stated objects of the invention have been attained by the provision of novel methods and apparatus for forming a variety of single convolutions in a tubular workpiece, the methods and apparatus having a range of application beyond that previously known and being capable of producing convolutions to extremely close tolerances with inexpensive mechanisms and simple technique.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for forming a convolution in a selected area of a tubular workpiece comprising a pair of freely rotatable cylindrical guide rolls for supporting said work piece at points closely adjacent said selected area, an inner forming roll of smaller diameter than said guide rolls, means mounting said inner forming roll internally of said workpiece opposite said selected area, means for bodily shifting said mounting means to selectively dispose the outer edge of said forming roll within and outwardly of the circumference of said guide rolls, and a freely rotatable outer forming roll mounted in opposed registering relation with said inner forming roll whereby when said inner roll is moved outwardly beyond said guide rolls, said selected area of said work piece will be forced outwardly into said outer forming roll to form a convolution in said work piece.

2. Apparatus for forming a convolution in a selected area of a tubular workpiece comprising, a pair of freely rotatable cylindrical guide rolls for supporting said work piece at points closely adjacent said selected area, an inner forming roll, a driven shaft drivingly connected to said forming roll, tubular means rotatably supporting said shaft, means for bodily shifting said tubular means to selectively dispose the outer edge of said inner forming roll within and outwardly of the circumference of said guide rolls, and a freely rotatable external forming roll mounted in opposed registering relation with said inner forming roll whereby when said inner forming roll is moved outwardly beyond said guide rolls the metal of said workpiece will be forced outwardly into said outer forming roll to form a convolution in said workpiece.

3. The apparatus according to claim 2 together with means for automatically limiting the movement of said tubular means whereby the convolution will be formed to a predetermined depth.

4. Apparatus for forming a convolution in a selected area of a tubular workpiece comprising freely rotatable means for loosely supporting a workpiece at points closely adjacent said selected area, an inner forming roll, a driven shaft drivingly connected to the forming roll, means for shifting said shaft to move said roll into forming contact with said selected area, comprising a piston connected to said shaft, means for selectively connecting said piston to pressure fluid and exhaust, and means responsive to a predetermined shifting movement of said shaft to interrupt the supply of pressure fluid to said piston whereby a convolution may be formed in said workpiece to a predetermined depth.

5. Apparatus for forming a convolution in a selected area of a tubular workpiece comprising, freely rotatable means for loosely supporting the workpiece at points closely adjacent said selected area, a power shaft rotatably mounted within said supporting means, an internal forming roll mounted adjacent one end of said shaft, opposite said selected area of said workpiece, endless driving means operatively connected to the other end of said shaft, means for bodily shifting said shaft and said internal forming roll to form a convolution in said selected area of said workpiece, comprising a piston operatively connected to said shaft, means for selectively connecting said piston to pressure fluid and exhaust, means responsive to a predetermined movement of said shaft to interrupt the supply of pressure fluid to said piston to control the depth of the convolution formed in said selected area of said workpiece, and means for maintaining said endless drive in substantially constant tension and in driving relation with said shaft throughout the range of movement thereof.

6. In apparatus for forming a convolution in a selected area of a tubular workpiece including a forming roll mounted on a shaft and means for normally supporting said workpiece in spaced relation with said forming roll, means for moving said shaft and said roll into forming engagement with said selected area of said workpiece to form said convolution therein comprising a tubular member rotatably supporting said shaft, means for producing rotary movement of said tubular member, and means operable in response to the rotary movement of said tubular member to bodily shift said tubular member carrying said shaft and said forming roll into and out of forming engagement with said workpiece.

7. Apparatus for forming a convolution in a selected area of a tubular workpiece comprising a frame, freely rotatable means mounted on said frame for loosely supporting the workpiece at points closely adjacent said selected area, an internal forming roll mounted on a shaft within said workpiece opposite said selected area, tubular means rotatably supporting said shaft at spaced points along its length, power means for rotating said tubular member, cooperating means on said tubular member and said frame operable to translate said rotary movement of said tubular member into bodily shifting movement to move said shaft and said forming roll into and out of forming engagement with said workpiece to form a convolution in said selected area, and means responsive to a predetermined bodily shifting movement of said tubular member for rendering said power means ineffective.

8. Apparatus for forming a convolution in a selected area of a tubular workpiece comprising, a pair of cylindrical guide rolls adapted to support said workpiece at points closely adjacent said selected area, a pair of bearing assemblies adapted, respectively, to rotatably support said guide rolls, a power shaft, means securing said bearing assemblies to said power shaft at opposite sides of said selected area, an inner forming roll mounted for rotation between said bearing assemblies opposite said selected area, means to shift said forming roll to dispose the outer edge thereof in forming contact with said selected area, and means drivingly connecting said power shaft and said forming roll.

9. As an attachment for a lathe having a driven chuck and a cross feed, apparatus for forming a single convolution in a selected area of a tubular workpiece comprising, a shaft adapted to be drivingly connected to said chuck, a pair of bearing assemblies secured to said shaft with a predetermined space therebetween, a pair of guide rolls mounted, respectively, on said assemblies adapted to support said workpiece at spaced points to dispose said selected area opposite the space between said bearing assemblies, an inner forming roll mounted for movement with said cross feed having a forming edge disposed between said bearing assemblies opposite said selected area whereby said forming edge may be shifted by movement of said cross feed into and out of forming contact with said selected area of said workpiece, and means drivingly connecting said roll and said shaft whereby said roll may be rotatably driven by rotation of said chuck to form a convolution in said selected area when said forming edge is in forming contact therewith.

10. A method of forming convolutions to a predetermined depth in a selected area of a tubular metallic workpiece comprising the steps of forming a pair of convolutions at spaced points within said selected area to a depth less than said predetermined depth, deepening said convolutions while permitting free outward radial movement of the metal therebetween, and forcing the central portion of said selected area radially outwardly in successive stages and in each stage forcing the sides of the convolution axially towards each other to form said convolution to said predetermined depth.

11. A method of forming convolutions in a selected area of a metallic tubular workpiece to a predetermined depth comprising the steps of forming a pair of convolutions at spaced points within said selected area to a depth less than said predetermined depth while restraining the intervening metal between said convolutions against substantial outward movement forcing said intervening metal radially outwardly beyond the depth of said pair of convolutions, forcing all of said selected area radially outwardly beyond the depth of said pair of convolutions, and finally forcing the central portion of said selected area radially outwardly to said predetermined depth while forcing the sides of the convolution axially towards each other.

References Cited in the file of this patent

UNITED STATES PATENTS

| | | |
|---|---|---|
| 971,838 | Fulton | Oct. 4, 1910 |
| 1,711,075 | Zimmerman | Apr. 30, 1929 |
| 1,740,792 | Strachauer | Dec. 24, 1929 |
| 1,810,342 | Bulger | June 16, 1931 |
| 1,856,151 | Boss et al. | May 3, 1932 |
| 1,882,182 | Dreyer | Oct. 11, 1932 |
| 2,377,406 | Dedrick | June 5, 1945 |
| 2,402,490 | Farrar | June 18, 1946 |
| 2,617,466 | Kradoska | Nov. 11, 1952 |

FOREIGN PATENTS

| | | |
|---|---|---|
| 595,009 | Germany | Mar. 26, 1934 |
| 903,151 | France | Jan. 8, 1945 |